United States Patent [19]

Edwards

[11] Patent Number: 4,662,241
[45] Date of Patent: May 5, 1987

[54] TWO-SHAFT GEAR DRIVE

[75] Inventor: Douglas F. Edwards, Mt. Vernon, Ohio

[73] Assignee: The J. B. Foote Foundry Co., Fredericktown, Ohio

[21] Appl. No.: 719,470

[22] Filed: Apr. 3, 1985

[51] Int. Cl.$^4$ .......................... F16H 37/08; F16H 1/40; F16H 3/08
[52] U.S. Cl. ........................................ 74/701; 74/705; 74/713; 74/740; 74/371
[58] Field of Search ................ 74/701, 700, 705, 710, 74/713, 694, 740, 366–376

[56] References Cited

U.S. PATENT DOCUMENTS

| | | | |
|---|---|---|---|
| 2,314,549 | 3/1943 | Milbrath | 74/376 |
| 2,675,710 | 4/1954 | Ruhland | 74/375 |
| 2,807,340 | 9/1957 | Butterworth | 74/701 |
| 2,821,868 | 2/1958 | Gregory | 74/701 X |
| 3,084,563 | 4/1963 | Fischer | 74/375 |
| 3,095,759 | 7/1963 | Herrod | 74/701 |
| 3,159,044 | 12/1964 | Feuillastre | 74/375 X |
| 3,563,110 | 2/1971 | Hauser | 74/473 R |
| 3,889,547 | 6/1975 | Sun et al. | 74/372 X |
| 3,994,182 | 11/1976 | Katayama | 74/375 |
| 4,103,566 | 8/1978 | Von Kaler et al. | 74/701 |
| 4,224,839 | 9/1980 | Von Kaler | 74/701 |
| 4,232,569 | 11/1980 | Hauser et al. | 74/701 |
| 4,297,906 | 11/1981 | Costello | 74/375 X |
| 4,355,549 | 10/1982 | Reinhard et al. | 74/850 |
| 4,515,031 | 5/1985 | Janson | 74/375 X |

FOREIGN PATENT DOCUMENTS 2722902  11/1978  Fed. Rep. of Germany ........ 74/701

Primary Examiner—Allan D. Herrmann
Assistant Examiner—Martin G. Belisario
Attorney, Agent, or Firm—Allen D. Gutchess, Jr.

[57] ABSTRACT

A gearbox, specifically a transaxle, which has the usual input shaft and only two additional, parallel shafts. The two shafts include an intermediate shaft on which a plurality of first gears and a first reverse sprocket are rotatably mounted. These have recesses which individually receive a shift member which is rotatably mounted on the intermediate shaft and is selectively engaged with the recesses to cause the gears and the sprocket to be selectively individually rotated with the intermediate shaft. A drive gear is also affixed to and rotates with the intermediate shaft. The two shafts also include an output shaft or axle on which a plurality of second gears and a second reverse sprocket are rotatably mounted. The second gears mesh with the first gears and the second reverse sprocket is connected to the first reverse sprocket. An output gear meshes with the input gear and is connected to and rotates with the output shaft. An additional output shaft or axle can be axially aligned with the first, with a differential therebetween to which the output gear is affixed.

1 Claim, 4 Drawing Figures

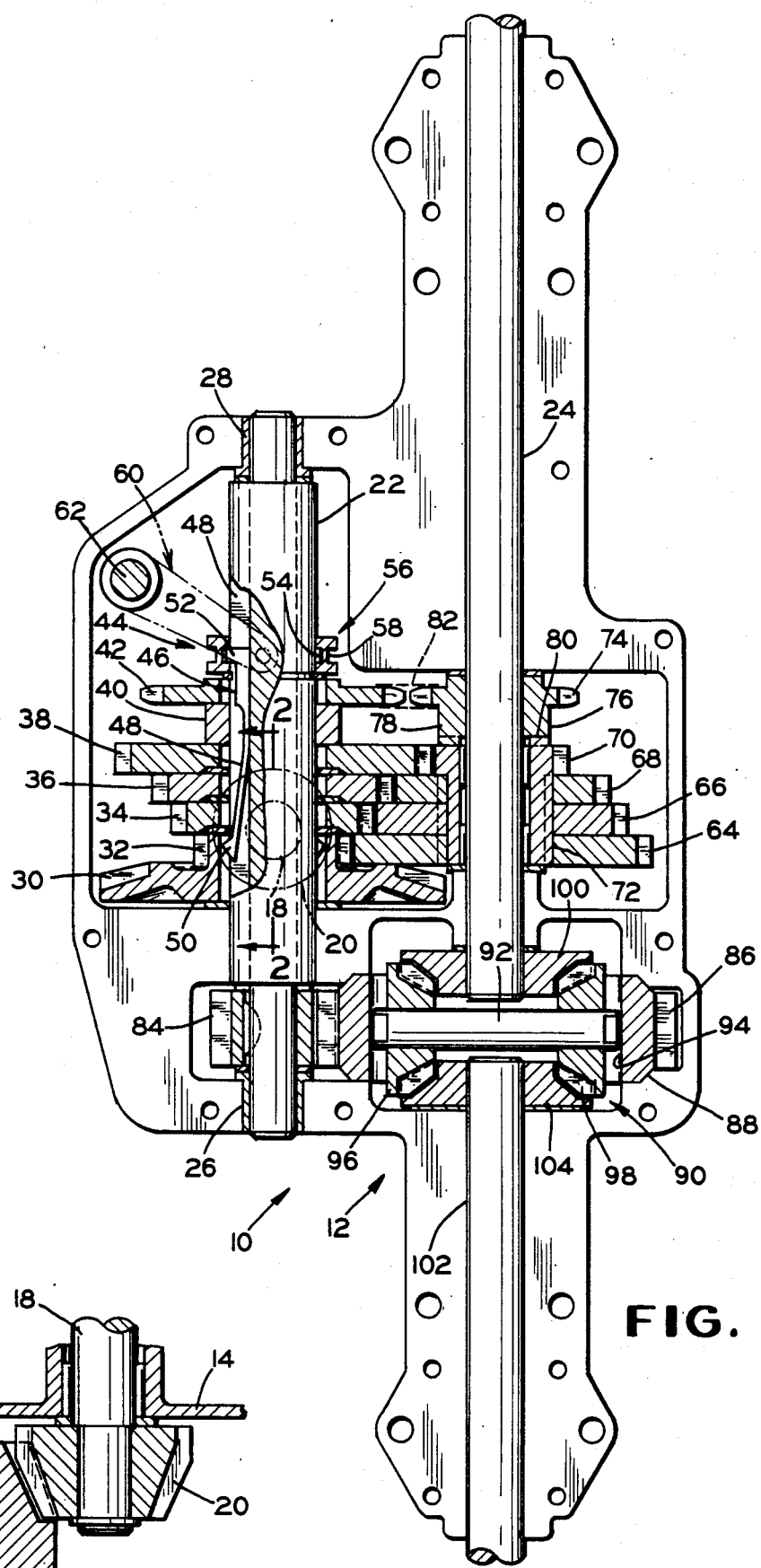
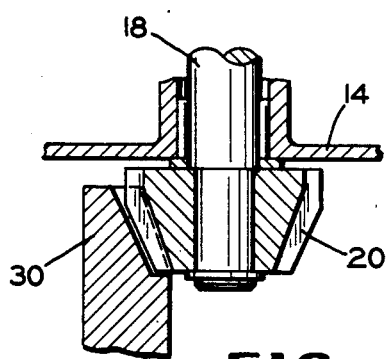
FIG. 1
FIG. 2

TWO-SHAFT GEAR DRIVE

This invention relates to a gearbox, specifically a transaxle, which has the usual input shaft and only two additional parallel shafts.

Transaxles heretofore known have had the usual input shaft and three additional, parallel shafts. Meshing or connected gears and reverse sprockets are mounted on two of the shafts and a differential is connected to the third shaft, which actually constitutes two axially aligned shafts, or axles.

The present invention provides a gearbox, and specifically a transaxle, which has only two parallel shafts, thereby substantially reducing the costs of the unit. A plurality of first gears and a first reverse sprocket are rotatably mounted on a first or intermediate shaft within a housing, with the gears and sprockets having recesses. A shift member is rotatable with the first shaft and is selectively engagable with the recesses to cause the gears and the sprocket to be selectively individually rotated with the first shaft. A drive gear is also affixed to and rotates with the first shaft. A driven gear meshes with the drive gear and is connected to the second or output shaft to rotate same. A plurality of second gears and a second reverse sprocket are rotatably mounted on the output shaft. The second gears mesh with the first gears and the second sprocket is connected by a suitable chain to the first sprocket. All of the second gears and second sprocket are rotatably mounted on the second shaft and at least some of the second gears and the second sprocket rotate together.

The elimination of a third parallel shaft in the gear train substantially reduces the cost of the unit by eliminating the shaft, additional gears, and bearings, as well as reduces the size and complexity of the housing. Maintinance problems are also lessened.

It is, therefore, a principal object of the invention to provide a less expensive gear drive having multiple speeds.

Another object of the invention is to provide a gearbox having multiple forward speeds and reverse which eliminates one of the shafts which has been heretofore required.

A further object of the invention is to provide a transaxle having only two parallel shafts in addition to the usual input shaft, with one of the shafts being two axially-aligned axles connected by a differential.

Many other objects and advantages of the invention will be apparent from the following detailed description of preferred embodiments thereof, reference being made to the accompanying drawings, in which:

FIG. 1 is a somewhat schematic plan view, with parts in section, of a transaxle embodying the invention, with an upper housing part removed;

FIG. 2 is a somewhat schematic view in section taken along the line 2—2 of FIG. 1;

Figure 3:
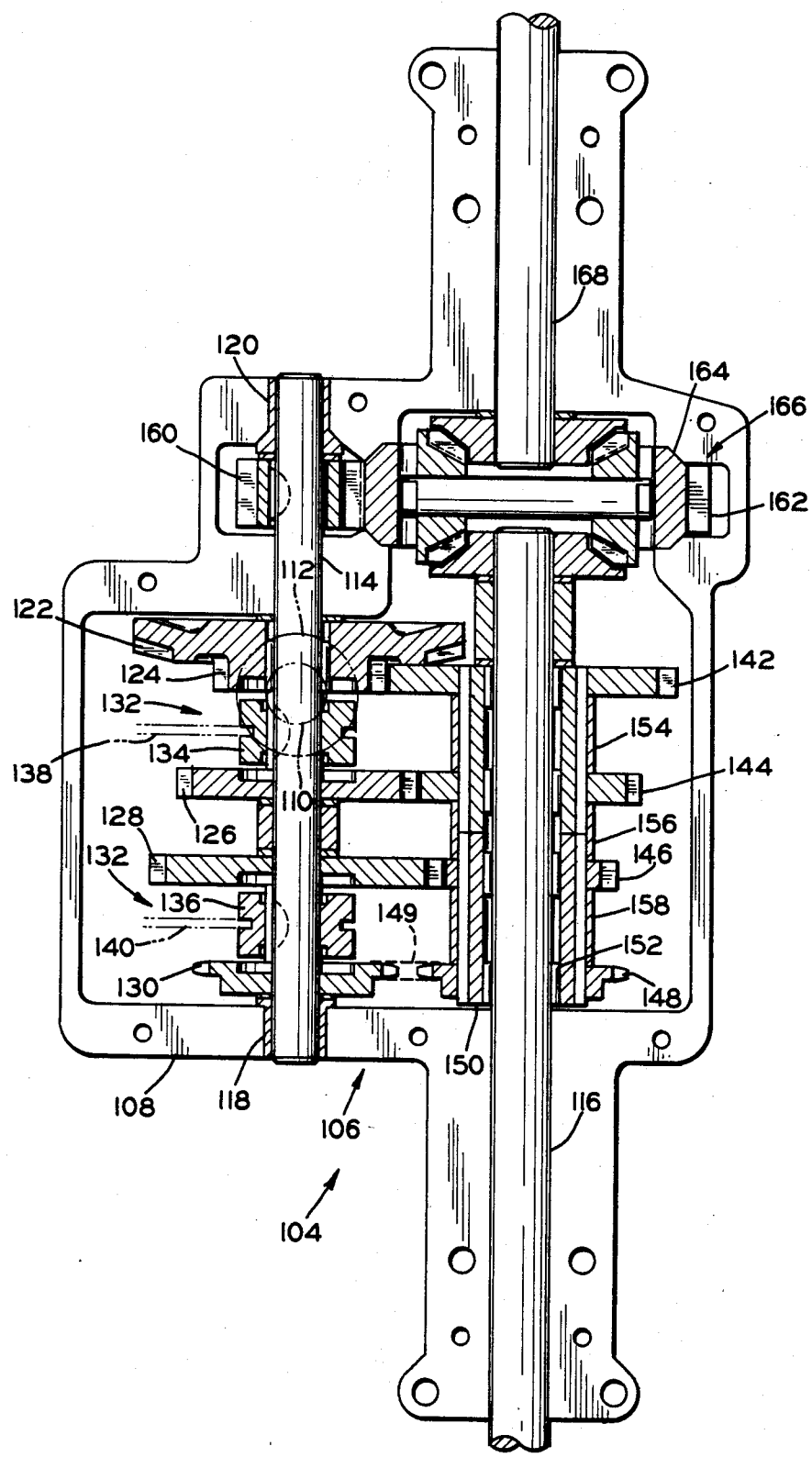
FIG. 3 is a view similar to FIG. 1 of a modified transaxle in accordance with the invention.

Referring to the drawings, and more particularly to FIGS. 1 and 2, a gearbox or transaxle 10 according to the invention includes a housing 12 having an upper part 14 (FIG. 2) and a lower part 16. The transaxle has an input shaft 18 and a drive bevel gear 20. The input shaft 18 can be driven by any suitable means such as a pulley (not shown) affixed thereto and driven through a belt by a pulley mounted on an engine of a small vehicle with which the transaxle 10 is used. The transaxle 10 also has a first, parallel or intermediate shaft 22 and a second, parallel output shaft or axle 24. The first shaft 22 is rotatably supported at its ends by bushings 26 and 28 which are mounted in side walls of the housing parts 14 and 16.

A combination driven bevel gear 30 is rotatably supported on the shaft 22 and is driven by the drive bevel gear 20 to provide a first forward speed for the transaxle. A first gear or toothed member 32 is structurally integral and rotates with the driven bevel gear 30. Additional first, forward speed gears or toothed members 34, 36, and 38 are also rotatably supported on the shaft 22, being individual and separate from one another. A neutral collar 40 is located on the shaft 22 adjacent the gear 38 and separates it from a first reverse sprocket or toothed member 42 which is also rotatably supported on the shaft 22.

The four first gears 32–38 and the reverse sprocket 42 are selectively individually rotated with the shaft 22 by shift mechanism indicated at 44. The shift mechanism 44 includes a pair of diametrically opposite shift or draw keys 46 which are slidably mounted in longitudinal grooves 48 in the shaft 22. Each of the shift keys 46 includes a resilient shank 48 having a lug 50 at one end and a projection 52 at the other end. The projection 52 is received in an inner annular groove 54 of a shift collar 56 which also has an outer annular groove 58. When the shift key 46 is moved longitudinally of the shaft 22, the lug 50 selectively engages recesses or notches on the inner diameters of the gears 32–38 and the sprocket 42 to individually connect them with the shaft 22 so as to rotate therewith. Washers are located between the gears 32–38 to depress the lug 50 between the gears, as is known in the art. When the lug 50 is under the neutral collar 40, none of the toothed members is engaged with the shaft.

The shift key 46 is moved longitudinally by the shift collar 56 which, in turn, is moved along the shaft by a shifter member or fork 60 which includes a pivotal shaft 62. An upper portion of this shaft extends through the upper housing part 14 and is pivoted by a suitable arm (not shown) to pivot the shaft and shift the gears, as is well known in the art.

In accordance with the invention, four second, forward speed gears or toothed members 64–70 are rotatably supported on the output shaft or axle 24 and mesh, respectively, with the four first gears 32–38. In this instance, all four of the gears 64–70 rotate together, the gears 64–68 being mounted on a splined hub 72 which is structurally integral with the gear 70. A second reverse sprocket or toothed member 74 is also rotatably supported on the output shaft 24. The sprocket 74 is integral with a hub 76 having notches 78 receiving lugs 80 which extend from an end of the splined hub 72 to cause the sprocket 74 also to rotate with the gears 64–70. The sprocket 74 is connected to the first reverse sprocket 42 by a suitable chain 82.

A drive gear or toothed member 84 is keyed or otherwise suitably affixed to the shaft 22 and rotates therewith. The gear 84 meshes with and drives a ring gear or toothed member 86 which is connected to the output shaft 24 to cause it to rotate when the gear 86 is driven by the gear 84. In this instance, the ring gear 86 is located around a housing or supporting member 88 of a differential 90 which can be of the type shown in U.S. Pat. No. 4,232,569, issued on Nov. 11, 1980. The differential includes an idler shaft 92 received in grooves 94 of the housing 88 with idler bevel or miter gears 96 and 98 mounted on the ends of the idler shaft. A bevel or miter gear 100 is affixed to an end of the output shaft 24 and meshes with the idler bevel gears 96 and 98. An output shaft or axle 102, which is axially aligned with the shaft 24, also has a bevel or miter gear 104 affixed to an end thereof and meshes with the idler gears 96 and 98. The two axially aligned output shafts 24 and 102 are considered to be one shaft for purposes of the invention, as discussed herein. If a differential is not used, the ring gear 86 can be suitably affixed to both of the shafts 24 and 102 to cause them to be driven together as a single shaft.

With the second toothed members 64–70 and 74 being rotatably mounted on the output shaft 24, the necessity of a third parallel shaft is eliminated, not only eliminating the shaft but additional gear components and bearings. The overall size of the transaxle can also be reduced and the mechanism simplified, thereby reducing maintenance problems.

In operation, with the lug 50 engaging the recess of the driven bevel gear 30 and the first gear 32, as shown, the drive gear 84 is driven directly from the bevel gear 30 through the shaft 22. The gear 84 thereby rotates the ring gear 86 and the output shaft 24 at a first forward speed. When the lug 50 is in the recess of the first gear 34, the drive is through the first gear 32, the second gears 64 and 66, which rotate together on the splined hub 72, and the first gear 34 which is connected with the shaft 22 and rotates the drive gear 84. With the lug 50 engaged in the recess of the first gear 36, a third forward speed is attained through the gears 32, 64, 68, and 36 to the shaft 22 and the drive gear 84. With the lug 50 in the recess of the first gear 38, the drive is then through the gears 32, 64, 70, and 38 to the shaft 22 and the drive gear 84. With the lug 50 under the neutral collar 40, the transaxle is in neutral. With the lug engaged in the recess of the first reverse sprocket 42, the drive is through the gears 32 and 64 and through the sprockets 74 and 42 to drive the shaft 22 and the drive gear 84 in the opposite direction.

Referring more particularly to FIG. 3, a modified gearbox or transaxle 104 embodying the invention employs an H-pattern shift. This type of shift, employing two side-by-side shifter forks, is well known in the art, as shown, for example, in U.S. Pat. No. 4,355,549, issued Oct. 26, 1982, and discussed more fully in U.S. Pat. No. 3,563,110, issued Feb. 16, 1971. The transaxle 104 has a housing 106 including an upper part (not shown) and a lower part 108. The transaxle has an input shaft 110 and a drive bevel gear 112, indicated by dotted lines, with the input shaft being driven by suitable means similar to the input shaft 18 of the first embodiment of FIGS. 1 and 2. The transaxle 104 has a first, parallel or intermediate shaft 114 and a second, parallel output shaft or axle 116. The first shaft 114 is rotatably supported at its ends by bushings 118 and 120 and a middle portion is also supported by an intermediate portion of the housing 106.

A combination driven bevel gear 122 is rotatably supported on the shaft 114 and is driven by the drive bevel gear 112 to provide a first forward speed for the transaxle. A first gear or toothed member 124 is structurally integral and rotates with the driven bevel gear 122. Additional first gears 126 and 128 are also individually rotatable on the shaft 114 to provide two additional forward speeds for the transaxle 104. A first reverse sprocket or toothed member 130 is rotatably supported on the shaft 114 to provide one reverse speed for the transaxle.

The three first gears 124–128 and the reverse sprocket 130 are selectively individually rotated with the shaft 114 by shift mechanism generally indicated at 132. The shift mechanism includes two shifting dogs 134 and 136 which are slidably mounted on the shaft 114 and keyed thereto for rotation therewith. The dogs are moved longitudinally of the shaft 114 by two shift forks 138 and 140 to individually engage shift-receiving means or recesses in the first gears 124–128 and the reverse sprocket 130. The shift forks are arranged so that only one of the dogs 134 or 136 can engage one of the gears or sprocket at a time. When one of the dogs is engaged with one of the recesses, that particular gear or sprocket rotates with the shaft 114. When none of the recesses are engaged, with the dogs 134 and 136 being in the position shown, the transaxle is in neutral.

In accordance with the invention, three second gears or toothed members 142–146 are rotatably supported on the output shaft or axle 116 and mesh, respectively, with the three first gears 124–128. A second reverse sprocket or toothed member 148 is connected to the reverse sprocket 130 by a suitable chain 149. All four of the toothed members 142–148 rotate together, being mounted on a two-part, splined hub 150 which is rotatably supported on the shaft 116 by bearings 152. The hub 150 is made of two parts only for manufacturing purposes. The gears and sprocket are also maintained in spaced relation by spacing sleeves 154, 156, and 158 located around the hub 150.

A drive gear or toothed member 160 is affixed to the shaft 114 and rotates therewith. The gear 160 meshes with and drives a ring gear or toothed member 162 which is connected to the output shaft 116 to cause it to rotate when the gear 162 is driven by the gear 160. In this instance, the ring gear is located around a housing or supporting member 164 of a differential 166 which can be similar to the differential 90. An output shaft or axle 168, which is axially aligned with the shaft 116, is connected to the differential 166 and driven thereby, along with the shaft 116. The two axially aligned output shafts 116 and 168 are considered to be one shaft for purposes of the invention. If a differential is not used, the ring gear 162 can be suitably affixed to both of the shafts to cause them to be driven together as a single shaft.

In operation, with the dog 134 engaging the recess of the combination gear 122 and 124, the drive gear 160 is driven directly through the shaft 114. The gear 160 thereby rotates the ring gear 162 and the output shaft 116 at a first forward speed. When the dog 134 is engaged in the recess of the first gear 126, the drive is through the first gear 124, the second gear 142, the second gear 144, and the first gear 126 which is connected with the shaft 114 and rotates the drive gear 160, producing a second forward speed. When the dog 136 is engaged in the recess of the first gear 128, a third forward speed is attained through the gears 124, 142, 146, and 128 to the shaft 114 and the drive gear 160. When the dog 136 is engaged in the recess of the first reverse sprocket 130, the drive is through the gears 124, 142 and the sprockets 148 and 130 to drive the shaft 114 and the drive gear 160 in the opposite direction.

Figure 4:
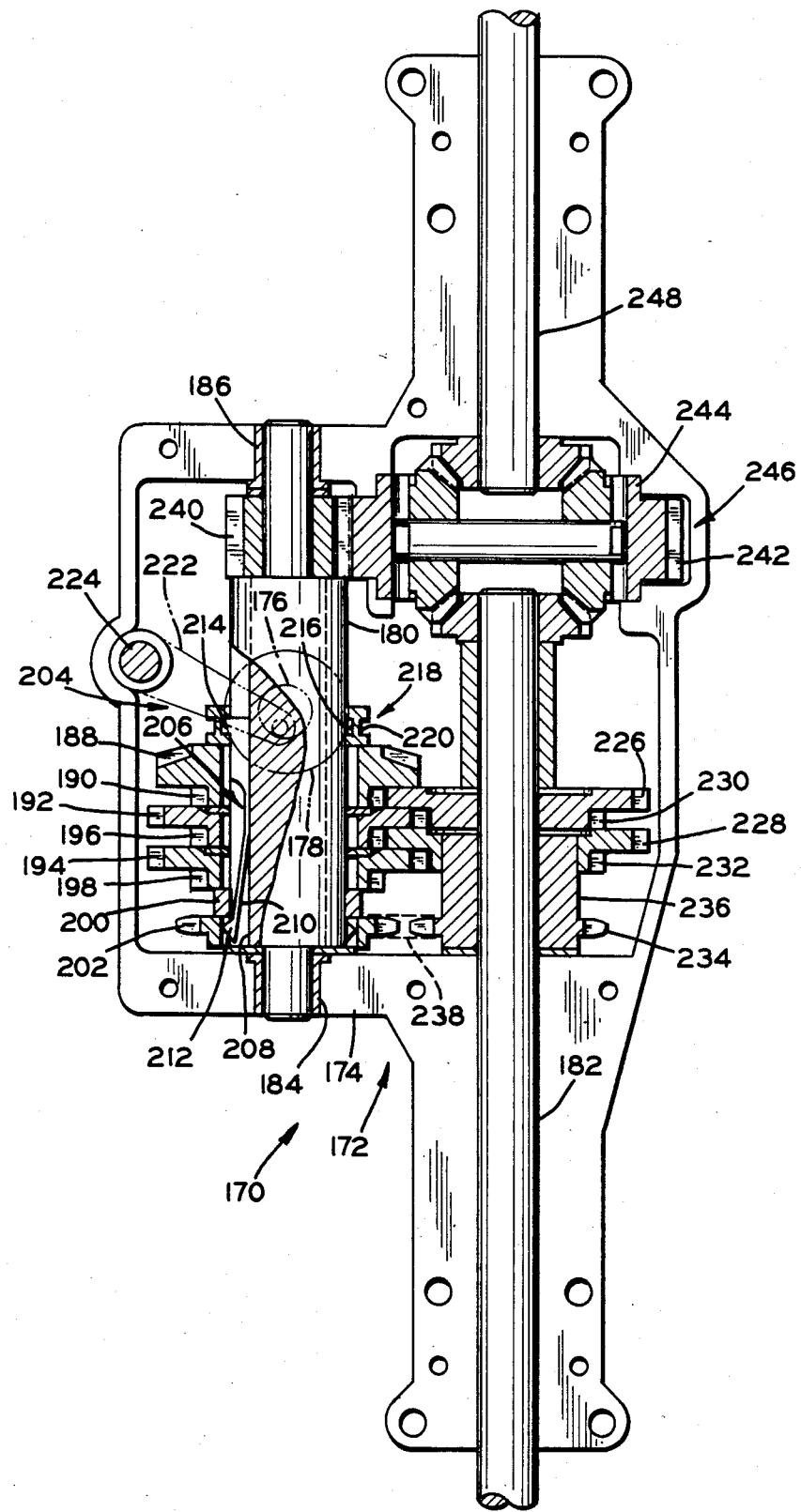
FIG. 4 is a view similar to FIGS. 1 and 3 of a further modified transaxle in accordance with the invention.

Referring to FIG. 4, another embodiment of the invention is indicated by a transaxle 170. This embodiment of the invention is somewhat similar to the transaxle of FIGS. 1 and 2, employing a similar shift mechanism, but also employing a plurality of substantially identical first and second gears. In this instance, four similar forward speed combination gears are employed, having the same number of teeth. The transaxle 170 includes a housing 172 having an upper part (not shown) and a lower part 174. The transaxle has an input shaft 176 and a drive bevel gear 178, shown in dotted lines, the shaft being suitably driven. The transaxle 170 also has a first, parallel or intermediate shaft 180 and a second, parallel output shaft or axle 182. The first shaft 180 is rotatably supported at its ends by bushings 184 and 186 which are mounted in side walls of the housing 172.

A combination driven bevel gear 188 is rotatably supported on the shaft 180 and is driven by the drive bevel gear 178 to provide a first forward speed for the transaxle. A first gear or toothed member 190 is structurally integral and rotates with the driven bevel gear 188. Additional first gears or toothed members 192 and 194 are also rotatably supported on the shaft 180, being individual and separate from one another. The gears 192 and 194 also are combination gears and have gears 196 and 198 structurally integral and rotatable with them. A neutral collar 200 is located on the shaft 180 adjacent the gear 198 and separates it from a first reverse sprocket or toothed member 202 which is also rotatably supported on the shaft 180.

The combination gears 188–198 and the sprocket 202 are selectively individually rotated with the shaft 180 by shift mechanism indicated at 204. This includes a pair of diametrically opposite shift or draw keys 206 which are slidably mounted in longitudinal grooves 208 in the shaft 180. Each of the shift keys 206 includes a resilient shank 210 having a lug 212 at one end and a projection 214 at the other end. The projection 214 is received in an inner annular groove 216 of a shift collar 218 which also has an outer annular groove 220. When the shift key 206 is moved longitudinally of the shaft 180, the lug 212 selectively engages recesses or notches on the inner diameters of the combination gears and sprocket to individually connect them with the shaft 180 so as to rotate therewith. When the lug 212 is under the neutral collar 200, none of the toothed members is engaged with the shaft.

The shift key 206 is moved longitudinally by the shift collar 218 engaged by a shifter member or fork 222 which includes a pivotal shaft 224. This shaft is pivoted by a suitable arm (not shown) to pivot the shaft and shift the gears, as in FIG. 2.

In accordance with the invention, second combination gears or toothed member 226 and 228, combined with structurally integral gears 230 and 232, respectively, are rotatably supported on the output shaft or axle 182. The second gears 226 and 228 mesh, respectively, with the first gears 190 and 192, the gear 198 being non-functional. In this instance, the combination gears 226, 230, and 228, 232 rotate independently of one another on the output shaft 182. A second, reverse sprocket or toothed member 234 has a splined hub 236 on which the combination gear 228, 232 is mounted so that the combination gear and the sprocket 234 rotate together. The sprocket 234 is connected to the first sprocket 202 by a suitable chain 238.

A drive gear or toothed member 240 is keyed or otherwise suitably affixed to a smaller portion of the shaft 180 and rotates therewith. The gear 240 meshes with and drives a ring gear or toothed member 242 which is connected to the output shaft 182 to cause it to rotate when the gear 242 is driven by the gear 240. The ring gear 242 is located around a housing or supporting member 244 of a differential 246, which can be similar to the differentials of FIGS. 1 and 3. The output shaft 182 is driven through bevel gears of the differential along with an output shaft 248 which is axially aligned with the output shaft 182. The two aligned shafts are again considered to be one shaft for purposes of the invention. If a differential is not used, the ring gear 242 can be suitably affixed to both of the shafts 182 and 248 to cause them to be driven together as a single shaft.

With the transaxle 170, not only is the necessity of a third parallel shaft eliminated, but the similar combination gears further reduces the cost of the transaxle.

In operation, with the lug 212 engaging the recess of the driven bevel gear 188, the drive gear 240 is driven directly from the gear 188 through the shaft 180. The gear 240 thereby rotates the ring gear 242 and the output shaft 182 at a first forward speed. When the lug 212 is moved to the recess of the combination gear 192, 196, the drive is through the gear 190, the gears 226, 230, and the first gear 192 to rotate the drive gear 240 through the shaft 180 at a second forward speed. With the lug 212 engaged in the recess of the combination gear 194, 198, a third forward speed is attained through the gears 190, 226, 230, 192, 196, 228, 232, and 194 to the shaft 180 and the drive gear 240. With the lug 212 under the neutral collar 200, the transaxle 170 is in neutral. With the lug 212 engaged in the recess of the first reverse sprocket 202, the drive is through the gears 190, 226, 230, 192, 196, 228, and through the sprockets 234, 202 to drive the shaft 180 and the drive gear 240 in the opposite direction.

From the above, it will be seen that the invention provides a simplified, low cost gearbox, specifically a transaxle, which eliminates one parallel shaft entirely along with its attendent components. In one form, similar combination gears are also employed to further reduce the cost of the gearbox or transaxle.

Various modifications of the above-described embodiments of the invention will be apparent to those skilled in the art and it is to be understood that such modifications can be made without departing from the scope of the invention, if they are within the spirit and the tenor of the accompanying claims.

I claim:

1. A transaxle comprising a transaxle housing, an intermediate shaft rotatably mounted in said housing, a plurality of first gears rotatably mounted on said shaft for rotatable but non-slidable movement with respect thereto, at least two of said first gears being a combination gear, a first reverse sprocket rotatably mounted on said shaft, said gears and said sprocket having shift-receiving means, shift means rotatable with said shaft and selectively engageable with said receiving means to cause said gears and said sprocket to be selectively individually rotated with said shaft, a drive gear affixed to and rotatable with said shaft, a differential rotatably supported in said housing, said differential having a supporting member, a driven ring gear on said supporting member meshing with said drive gear, said supporting member having an idler shaft positioned perpendicularly to an axis of rotation of said supporting member, first and second bevel gears rotatably mounted on end portions of said idler shaft, a first output shaft rotatably supported by said transaxle housing, said output shaft having a third bevel gear affixed to an end of said output shaft and engageable with said first and second bevel gears, a second output shaft rotatably supported by said transaxle housing, said second output shaft having a fourth bevel gear affixed to an end of said second output shaft and engagable with said first and second bevel gears, a plurality of second gears rotatably mounted on said first output shaft, each of said second gears constantly meshing with one of said first gears, two of said second gears being a second combination gear, an additional two of said second gears being a third combination gear, said combination gears having similar numbers of teeth, said second and third combination gears being individually rotatable relative to one another, a second reverse sprocket rotatably mounted on said first output shaft, a chain connecting said first reverse sprocket and said second reverse sprocket, and means connecting said second combination gear and said second reverse sprocket for rotation together on said first output shaft.

* * * * *